United States Patent
Hu et al.

(10) Patent No.: US 8,634,887 B2
(45) Date of Patent: Jan. 21, 2014

(54) PROTECTIVE FRAME FOR MOBILE COMMUNICATION DEVICE

(75) Inventors: Li-Ming Hu, Taipei (TW); Yu-Chun Lu, Taipei (TW); Chin-Sheng Wang, Taipei (TW)

(73) Assignee: Core Design Communication Ltd., Taipei (TW)

( * ) Notice: Subject to any disclaimer, the term of this patent is extended or adjusted under 35 U.S.C. 154(b) by 0 days.

(21) Appl. No.: 13/398,556

(22) Filed: Feb. 16, 2012

(65) Prior Publication Data

US 2013/0088815 A1 Apr. 11, 2013

(30) Foreign Application Priority Data

Oct. 7, 2011 (TW) .............................. 100136397 A

(51) Int. Cl.
*H04M 1/00* (2006.01)
(52) U.S. Cl.
USPC ....................................... 455/575.8; 455/90.3
(58) Field of Classification Search
USPC ............. 455/90.3, 575.1, 575.8, 550.1, 575.4
See application file for complete search history.

(56) References Cited

U.S. PATENT DOCUMENTS

| | | | | |
|---|---|---|---|---|
| 6,975,889 | B2 * | 12/2005 | Chen et al. .................. | 455/575.1 |
| 2011/0157783 | A1 * | 6/2011 | Huang et al. .............. | 361/679.01 |
| 2012/0088558 | A1 * | 4/2012 | Song ........................... | 455/575.1 |
| 2013/0023313 | A1 * | 1/2013 | Kim ........................... | 455/575.8 |

* cited by examiner

*Primary Examiner* — Sonny Trinh

(57) ABSTRACT

The invention relates to a protective frame for a mobile communication device having a power charging port. The protective frame has a retractable frame body, including a main frame body; a sliding element for reciprocatingly sliding along a direction with respect to the main frame body between a retracted protection position where the mobile communication device is fixedly framed by the retractable frame body and a stretched auxiliary power supply position; and a fastening element for fixing the sliding element with respect to the main frame body at the retracted protection position and the stretched auxiliary power supply position. The protective frame also includes an auxiliary battery adapted for being detachably installed in the retractable frame body and electrically connected to the power charging port of the mobile communication device, when the sliding element are fixed with respect to the main frame body at the stretched auxiliary power supply position.

5 Claims, 11 Drawing Sheets

PROTECTIVE FRAME FOR MOBILE COMMUNICATION DEVICE

BACKGROUND OF THE INVENTION

1. Field of the Invention

The present invention generally relates to a protective frame for a mobile communication device and, more particularly, to a protective frame provided with an auxiliary battery and adapted to be used with a mobile phone.

2. Description of Related Art

Significant advancement in the communication technology has been made essentially thanks to, on one hand, the growth of network as well as, on the other hand, the presence of numerous and various types of revolutionary smartphones based on incessant technical breakthroughs in the mobile communication field during the last two decades. New generation smart-phones and tablet computers are not only provided with touch screens and more humanized operation interfaces, but also characterized by having multiple functions, such as on-line data uploading and downloading, game playing or audio/video information playing and so forth, all of which allow more advanced functions in the mobile communication devices, thus gradually eliminating the borderline thereof with general purpose personal computers or audio/video equipments. However, such developments in smart-phones and tablet computers lead to an increase in power consumption as compared to conventional communication-only electronic devices. Furthermore, to facilitate graphic data presentation, the screen size of new generation smart-phones and tablet computers becomes bigger and, thus, vulnerable to crashes or scratches. Consequently, users often additionally purchase protective frames or sleeves to reduce the risk of collision damage. In order to address the problems of power consumption and collision damage, efforts have been made by the manufacturers to provide a protective case equipped with an auxiliary rechargeable battery. The mobile communication devices with this design can be well-protected and further provided with an additional battery to prolong its application time.

FIG. 1 shows a conventional protective case that is provided with an auxiliary rechargeable battery. The protective case 1 is directly formed inside with a space for accommodating an auxiliary rechargeable battery 11 is directly formed inside the protective case 1, so that the auxiliary rechargeable battery 11 is directly fixed to the protective case 1. As a consequence, these two items are inseparable from each other, thus causing the following drawbacks. First, once the auxiliary rechargeable battery 11 has run out of electricity, it is inevitable to uninstall it along with the protective case from the mobile communication device for recharging. The user would be forced to choose either temporarily exposing the mobile communication device to the risk of scratches due to detachment of the protective case or refraining from recharging of the auxiliary rechargeable battery. If the protection function is chosen to be retained, the battery still need be carried along and undesirably add extra burden even it is already known that the auxiliary rechargeable battery cannot supply power. Meanwhile, if the user chooses to take off the auxiliary rechargeable battery for recharging, then the protective case need be detached as well and the original objective of protection for the mobile communication device may not be achieved.

Moreover, with such an inseparable design of case body along with the auxiliary battery, in case that the original battery of the mobile communication device itself is already well charged, the user is unable to simply select the protection feature alone and still has to carry an additional auxiliary rechargeable battery. The design would causes inconvenience for extra weight, even though the user may feel reluctant to carry the auxiliary battery. That it, although extra electric power is not required, the user is nonetheless forced to bring the auxiliary rechargeable battery, otherwise the protective case cannot be applied to the mobile communication device. However, such a situation is repugnant to user's demand for purchase, and also contrary to the initial goal of the product design. From the above-said descriptions, it can be seen that the user will inevitably face a dilemma of choice: whether or not to purchase a protective case that is provided with an auxiliary rechargeable battery. Such a design apparently fails to fulfill the actual need of users and appears to be quite unfriendly to the users.

In addition to the defects previously set forth, the conventional design eliminates the replaceability of the rechargeable battery as well. For example, if a traveler carries a high power consumptive device, such as a mobile phone or a tablet computer along a trip where power recharging may be inconvenient, it is pretty logical that a single auxiliary rechargeable battery would be insufficient for providing power to the device. Under such a condition, the user may typically recharge several auxiliary rechargeable batteries in advance for backup. However, this approach would be hindered in the case where the auxiliary rechargeable battery cannot be detached from the protective case. With this design, when the auxiliary rechargeable battery is running out of electricity, the user has to install another protective case as substitution and use another auxiliary rechargeable battery to supply electric power. This situation completely reveals the inconvenience of the design. A similar problem also exists in case of battery failure as the auxiliary rechargeable battery in the conventional design cannot be replaced. The usability of the protective case ends when the auxiliary rechargeable battery is ruined. If the auxiliary rechargeable battery simply loses its recharging capability, the conventional protective case can still be used to provide protection to the mobile communication device. However, if more serious problems like battery fluid leakage occur, the user will have to discard the battery in conjunction with the protective case, or else the mobile communication device or the user may be adversely influenced.

SUMMARY OF THE INVENTION

An objective of the invention is to provide a protective frame for mobile communication device, which allows an auxiliary battery to be freely combined with, or to be detached from, the protective frame, thereby offering the user with preferable options and application flexibility.

Another objective of the invention is to provide a protective frame for mobile communication device, which effectively implements carriage and replacement of multiple sets of auxiliary batteries.

Yet another objective of the invention is to provide a protective frame for mobile communication device, which allows the use of the protective frame solely to provide protection when additional power source is not required, thereby enabling convenient protection of the mobile communication device.

Still another objective of the invention is to provide a protective frame for mobile communication device, which facilitates convenient assembly and disassembly as well as handy operation.

The present invention discloses a protective frame for a mobile communication device, which is particularly suitable for a mobile communication device provided with a power charging port. The protective frame for mobile communication device according to the invention is adapted to provide protection to a mobile communication device provided with a power charging port. The protective frame comprises a retractable frame body and an auxiliary battery. The retractable frame body includes a main frame body; a sliding element, adapted for reciprocatingly sliding along a retraction direction in relation to the main frame body between a retracted protection position where the mobile communication device is fixedly framed by the retractable frame body and a stretched auxiliary power supply position; and a fastening element for fixing the sliding element with respect to the main frame body at the retracted protection position and the stretched auxiliary power supply position. The auxiliary battery adapted for being detachably installed in the retractable frame body and electrically connected to the power charging port of the mobile communication device, when the sliding element are fixed with respect to the main frame body at the stretched auxiliary power supply position.

By virtue of the aforementioned structural arrangement, it can be appreciated that a revolutionary change has been achieved by means of the protective frame disclosed herein. Through the structural arrangement between the main frame body and the sliding element, the protective frame can provide an architecture for freely retracting and extending. When the auxiliary battery is needed, it is possible to position the sliding element at the stretched auxiliary power supply position, so as to accommodate the above-said auxiliary battery. In the case where the auxiliary battery is not required, it is possible to shorten the protective frame by positioning the sliding element at the retracted protection position, thereby minimizing the size and weight of the protective frame.

By way of the sophisticated structural arrangement between the auxiliary battery and the protective frame disclosed herein, the invention enables convenient assembling of the auxiliary battery to the protective frame, as well as convenient disassembling of the auxiliary battery from the protective frame. When the auxiliary battery is removed, the size of the protective frame can be adjusted by a retraction operation. Therefore, when the mobile communication device is sufficiently charged with power or else the auxiliary battery has run out of electricity, it is possible to take off the auxiliary battery at all time, thereby saving the space and weight for carrying the mobile communication device. Meanwhile, under the condition that the mobile communication device is solely protected by the protective frame, the auxiliary battery can be removed and recharged independently. Moreover, once the auxiliary battery becomes aged and damaged, it is also possible to replace it with a new one without substituting it along with the protective frame, thereby conforming to the trend of environment protection. Especially, if the user heavily relies on the mobile communication device or the mobile communication device itself is extremely power consumptive and suffers from a short standby duration, the invention could provide an appropriate solution which allows the user to prepare a number of auxiliary batteries and have them fully recharged beforehand for timely replacement. In this way, the application time of the mobile communication device can be significantly increased, so as to eliminate the trouble of power depletion. As such, the aforementioned objectives can be completely achieved. The problem of inconvenience in using the conventional protective frame for mobile communication devices can be successfully resolved and a protective frame for mobile communication device offering features more close to the user's habits can be also realized.

DETAILED DESCRIPTION OF THE PREFERRED EMBODIMENTS

Figure 1:
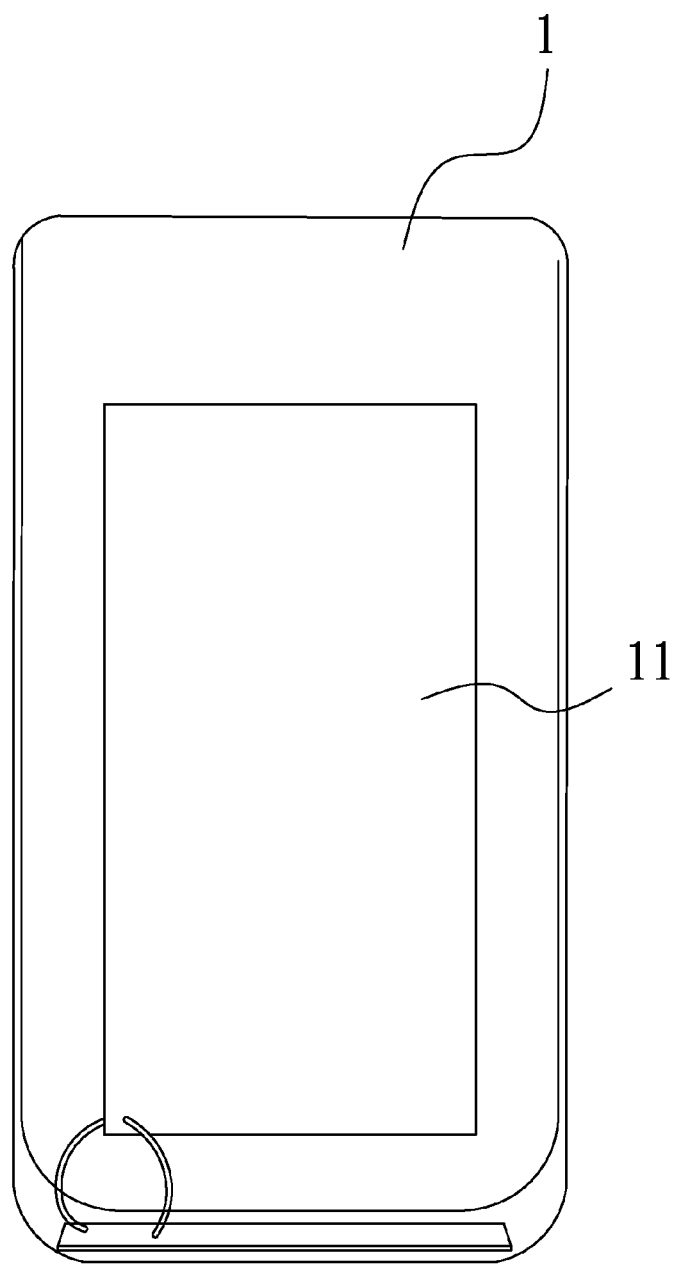
FIG. 1 shows a structure diagram of a conventional protective case.
Figure 2:
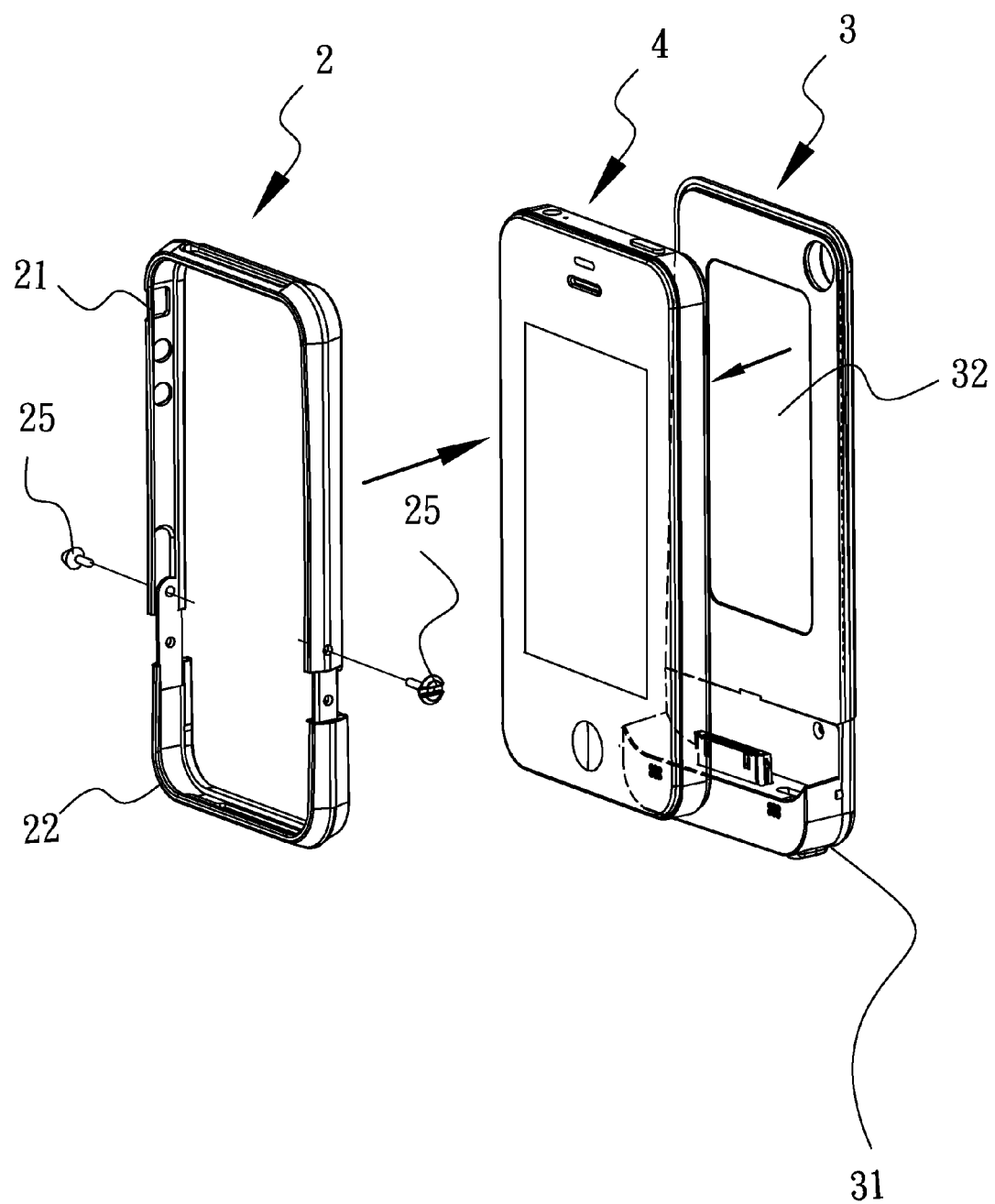
FIG. 2 shows a front side view for the retractable frame body and the auxiliary battery according to a first preferred embodiment of the invention.
Figure 3:
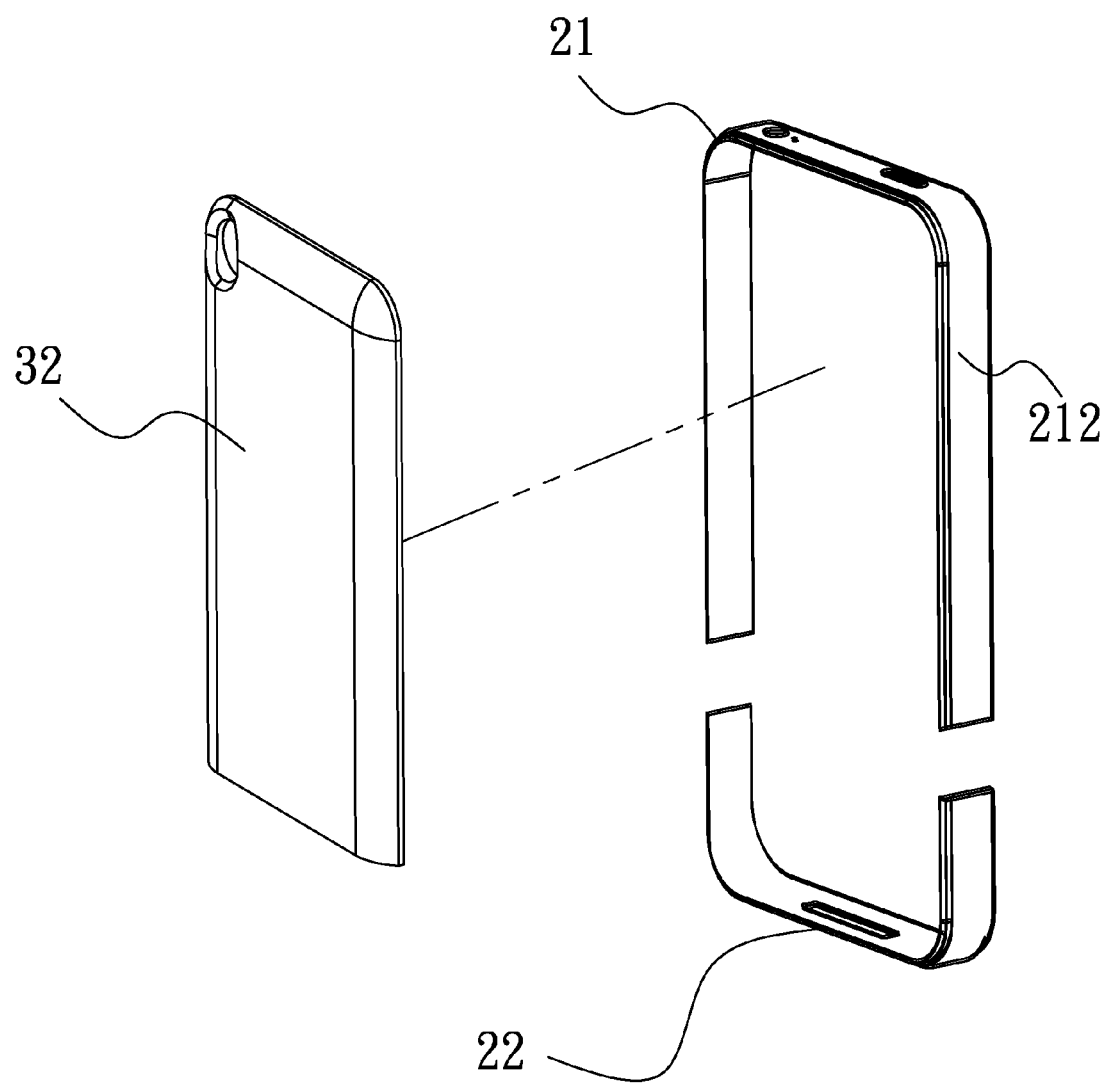
FIG. 3 shows a rear side view for the retractable frame body and the auxiliary battery according to a first preferred embodiment of the invention.
Figure 4:
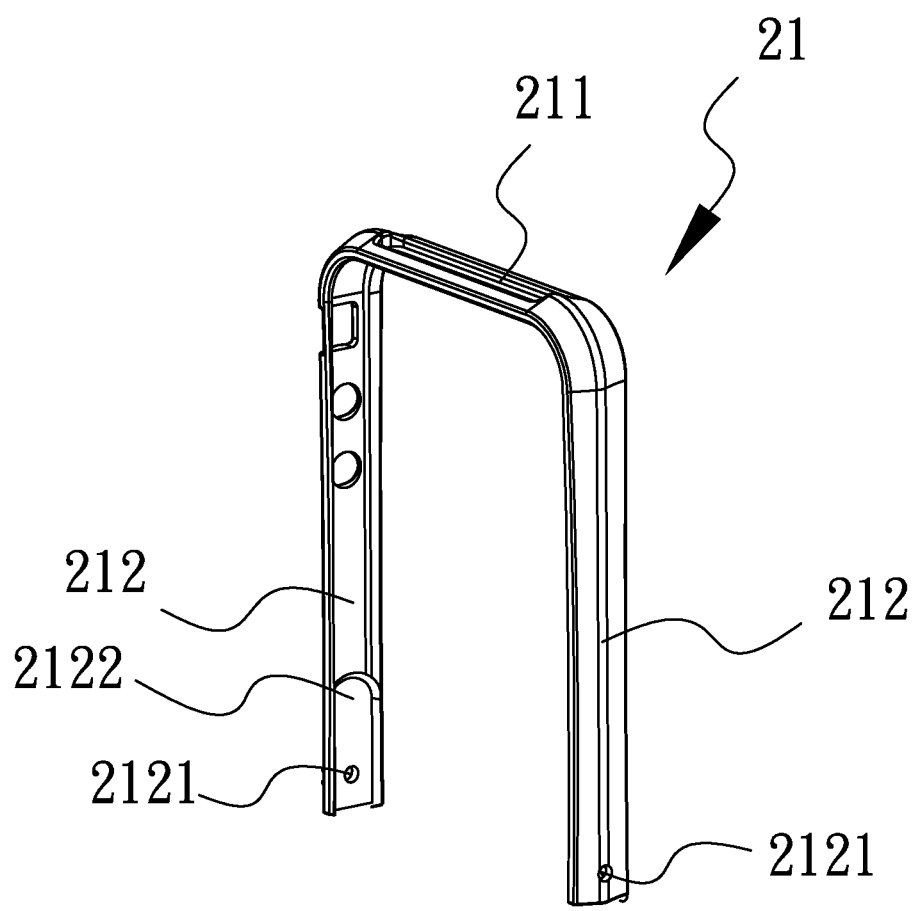
FIG. 4 shows a structure diagram of the main frame body in FIG. 2.

The invention discloses a protective frame for mobile communication device, wherein the mobile communication device described in the embodiment disclosed herein is exemplified as a mobile phone provided with a power charging port. FIGS. 2 and 3 are the front and rear side diagrams showing the assembling of a retractable frame body 2 and an auxiliary battery 3 into the protective frame according to the invention, wherein the retractable frame body 2 and the auxiliary battery 3 sandwich a mobile communication device 4 from left and right sides. The auxiliary battery 3 in this embodiment consists of two parts. The upper portion of the auxiliary battery 3 is configured as a power storing part 32, which constitutes a main body of the auxiliary battery 3. As shown in FIG. 2, the mobile communication device 4 has a front side for displaying images and a back side opposite to the front side, and the power storing part 32 is adapted to cover the back side of the mobile communication device 4. The lower portion of the auxiliary battery 3 is configured as a connector part 31 for coupling the mobile communication device 4 to the auxiliary battery 3. The retractable frame body 2 disclosed herein includes a main frame body 21, a sliding element 22 and a fastening element 25 for connection of the main frame body 21 to the sliding element 22. Herein the main frame body 21 in the upper portion of the frame body 2 exhibits a "Π" shape as shown in FIG. 4. For illustration purpose, the segment shown at the upper side of FIG. 4 is referred to as a top edge section 211, both sides of which are connected to lateral edge sections 212. Each of the lateral edge sections 212 is formed with a through hole 2121 and a fixing trough 2122 extending along the direction of the lateral edge section 212. The fixing trough 2122 has an opening at the lower end of the lateral edge section 212 as shown in FIG. 4.

Figure 5:
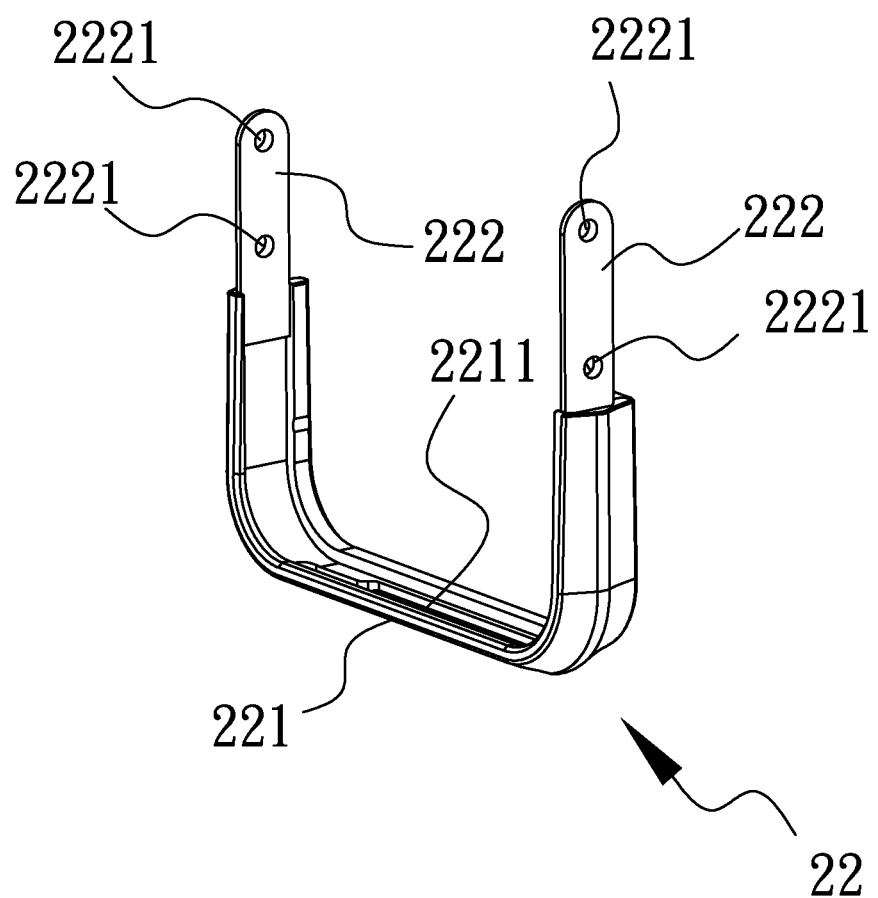
FIG. 5 shows a structure diagram of the sliding element in FIG. 2.

The sliding element 22 shown in FIG. 5 and the main frame body 21 together constitute a closed protective frame, and the portion of which exposed to the outside is referred to as a closure section 221. The closure section 221 has a perforated insertion hole 2211, and two sliding arms 222 extend upwardly from the closure section 221 as shown in FIG. 5 for insertion into the fixing trough 2122. Besides, each of the sliding arms 222 is formed with two fixing holes 2221 corresponding to the through holes 2121. The fixing holes 2221 serve as a connecting device for connection of the main frame body to the sliding element.

Figure 6:
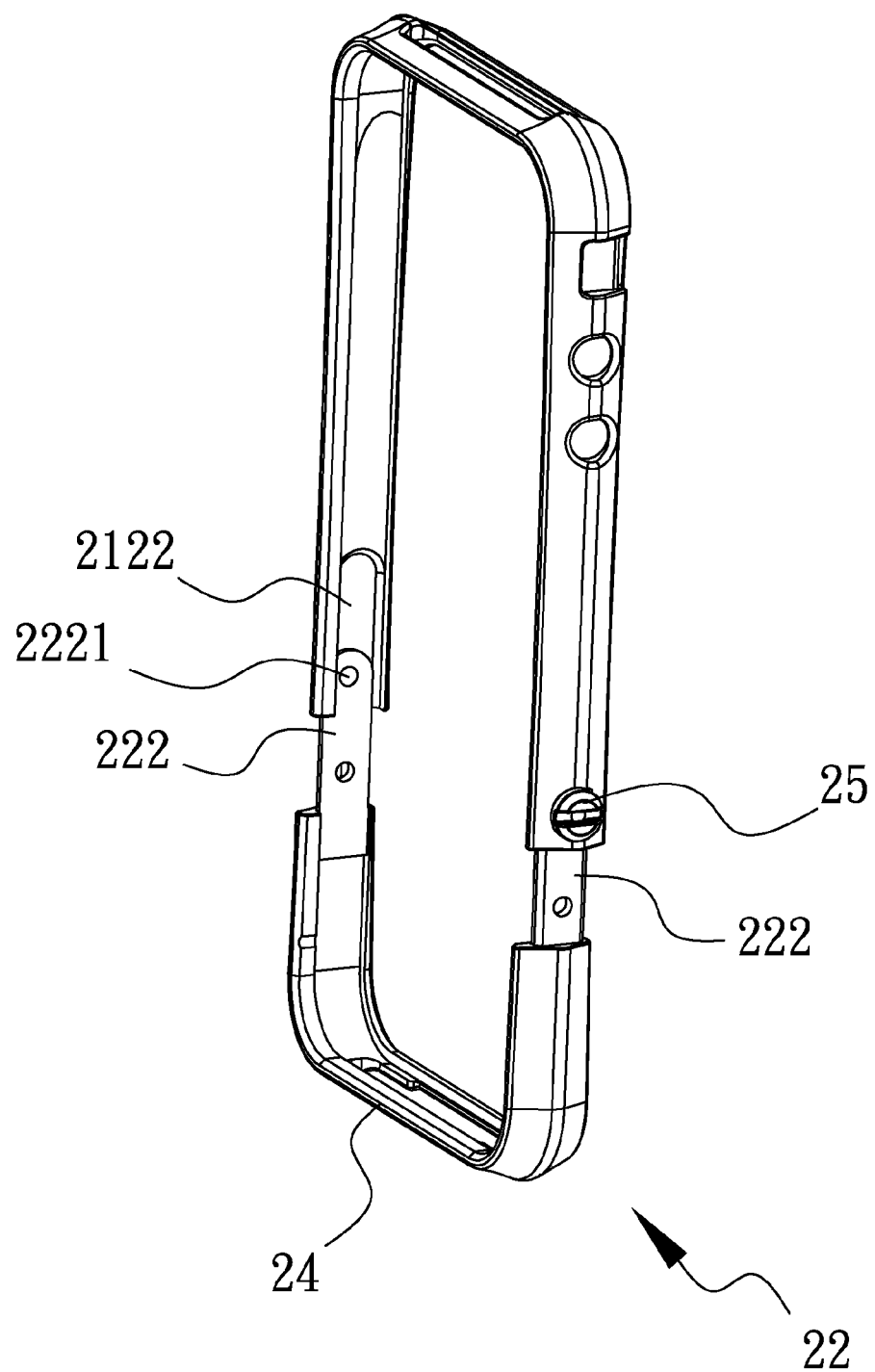
FIG. 6 is a schematic diagram showing the structural arrangement of the protective frame in FIG. 2 when the sliding element is positioned at the stretched auxiliary power supply position.
Figure 7:
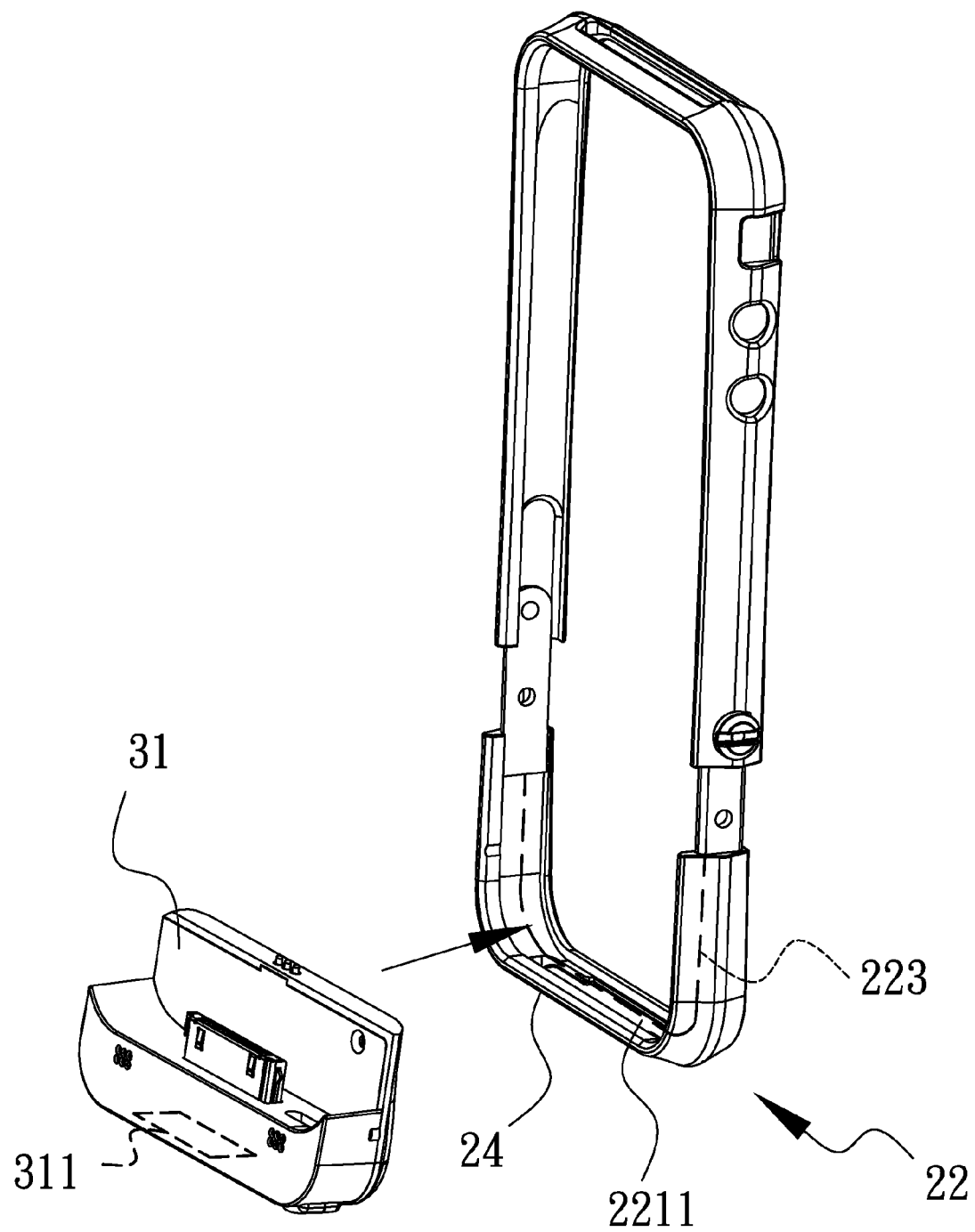
FIG. 7 is a schematic diagram showing the assembling of an auxiliary battery to the protective frame in FIG. 2, when the sliding element is positioned at the stretched auxiliary power supply position.

FIG. 6 shows the assembling relationship between the main frame body and the sliding element. As shown, the sliding arm 222 is made to slide into the fixing trough 2122 along the opening of the fixing trough 2122. Then the two components are connected by means of the fastening elements 25. When the user needs to use the auxiliary battery, the protective frame disclosed herein is adapted to provide a space for accommodating the auxiliary battery. Under such a circumstance, the fastening elements 25 are made to insert into the fixing holes 2221 formed in the upper portions of the sliding arms 222, so that the sliding element 22 are moved to a stretched auxiliary power supply position 24. As shown in FIG. 7, the space above the buckling trough 223 of the sliding element 22 is for disposition of the mobile phone. The sliding element 22 stretches downward to the stretched auxiliary power supply position 24. As the sliding element 22 reaches the stretched auxiliary power supply position 24, an accommodation space is formed for receiving the connector part 31 of the auxiliary battery. The buckling trough 223 as shown by the dashed lines in FIG. 7 can retain the connector part 31 on the sliding element 22 when the sliding element 22 is located at the stretched auxiliary power supply position 24. Herein the connector part 31 includes a connection port 311 which, in conjunction with the perforated insertion hole 2211 formed in the closure section 221, permit easy connection to a personal computer, a power line and the like by the user.

Figure 8:
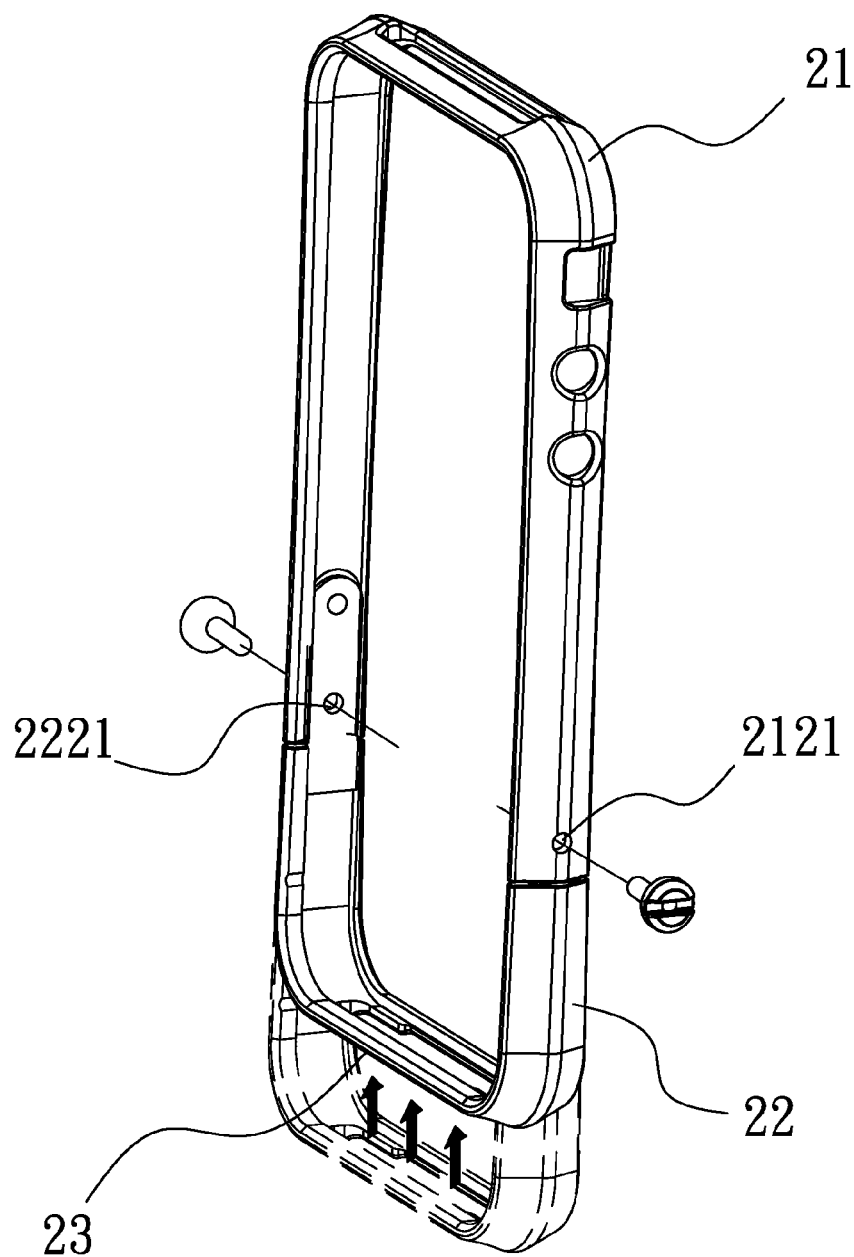
FIG. 8 is a schematic diagram showing the structural arrangement of the protective frame in FIG. 2 when the sliding element is positioned at the retracted protection position.

FIG. 8 shows the assembling mode of the protective frame according to the invention when the user removes the auxiliary battery. In other words, the sliding element 22 is no longer required to be located at the stretched auxiliary power supply position 24 shown in FIGS. 6 and 7. As illustrated in FIG. 8, in the case where the user does not need to use the auxiliary battery, the through holes 2121 of the main frame body 21 are made to register the fixing holes 2221 of the sliding element 22 near the lower side of FIG. 8. In contrast to the structural arrangement shown in FIGS. 6 and 7, it can be seen from FIG. 8 that the main frame body 21 and the sliding element 22 are moved toward each other as arrowed in FIG. 8. When the sliding element 22 shown in FIGS. 6 and 7 is moved to a retracted protection position 23, the sliding element 22 abuts against the bottom side of the mobile phone such that the protective frame can completely cover four edges of the mobile communication device. Therefore, when the user does not use the auxiliary battery, the protective frame located at the retracted protection position 23 can operate alone, independent of the auxiliary battery, without being forced to combine the protection function of the frame with the auxiliary battery.

Figure 9:
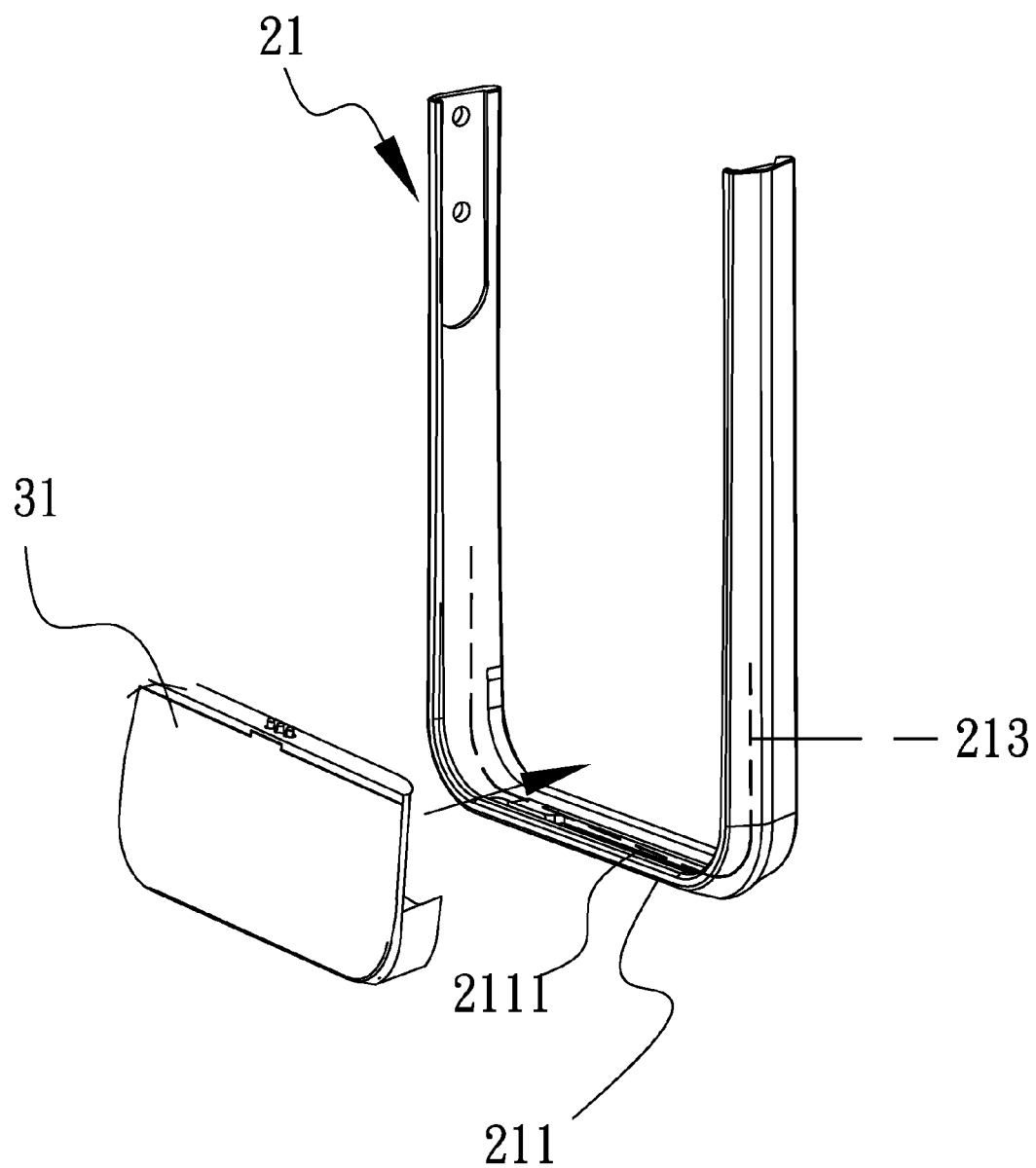
FIG. 9 is a schematic diagram showing the operation of the buckling trough according to the second preferred embodiment of the invention.

Of course, for those skilled in the art, it can be easily appreciated that the aforementioned structural arrangements and assembling method are merely exemplary rather than restrictive. In a second preferred embodiment according to the invention as shown in FIG. 9, the buckling trough can be otherwise formed on the main frame body 21, so that the main frame body 21 is has a buckling trough 213 as indicated by the dash lines. The buckling trough 213, in conjunction with a perforated insertion hole 2111 formed on the top edge section 211, permit the connector part 31 of the auxiliary battery to switch its location from the sliding element to the main frame body 21. The embodiment allows appropriate modifications in compliance with the contour of the mobile phone or the protective frame.

Figure 10:
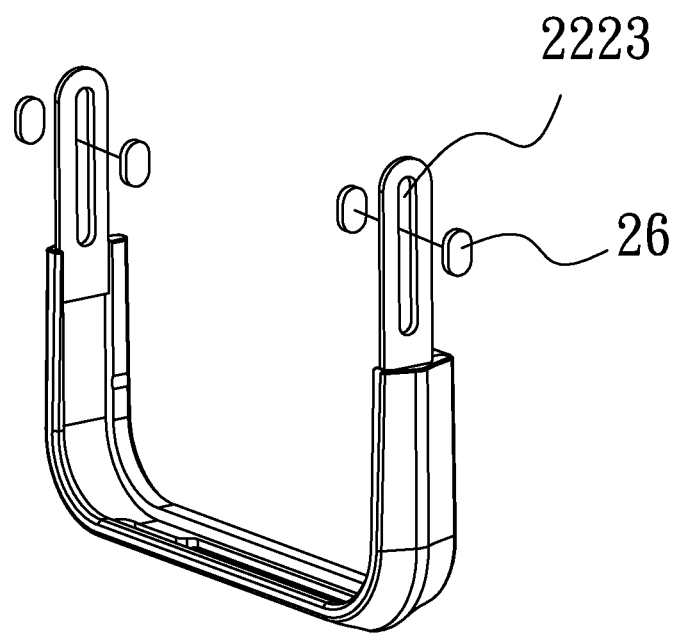
FIG. 10 is a schematic diagram for the sliding groove according to the third preferred embodiment of the invention.
Figure 11:
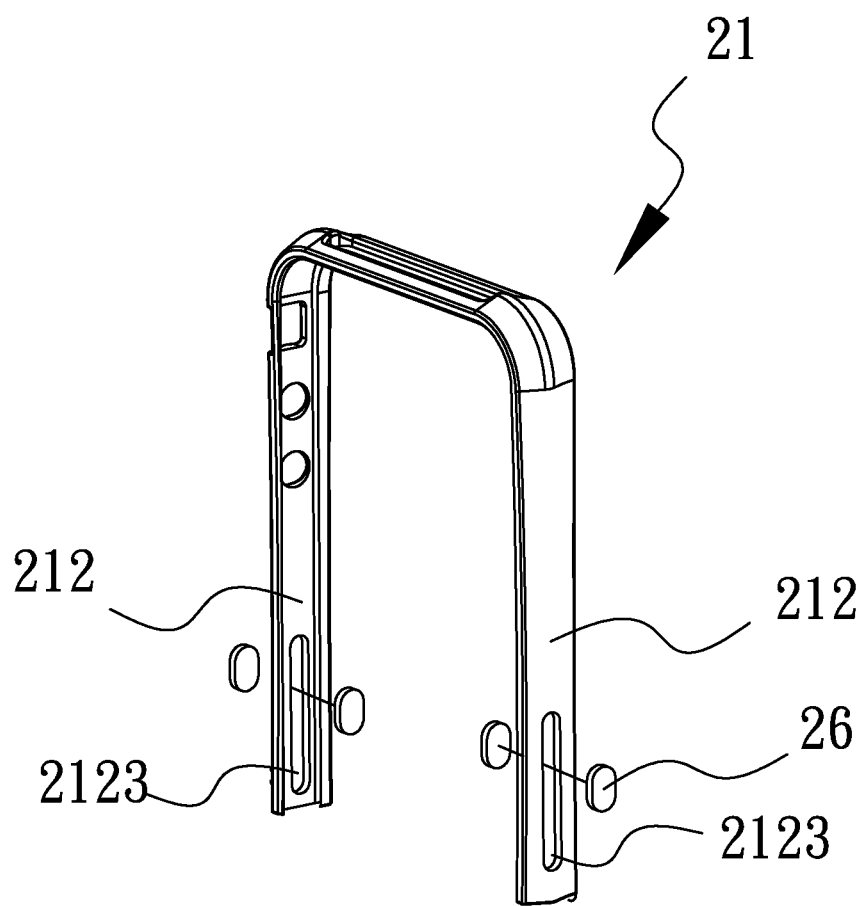
FIG. 11 is a schematic diagram showing the operation of the buckling trough according to the fourth preferred embodiment of the invention.

Moreover, in a third preferred embodiment according to the invention, the fixed trough is alternatively configured as a sliding groove. As shown in FIG. 10, the fixing troughs originally formed on the sliding element may be modified into sliding grooves 2223 with a perforated linear profile, thereby facilitating up/down slide of bolts 26 acting as the fastening elements. In this embodiment, the bolt 26 is composed of a movable rod and screw caps on two sides of the movable rod, so as to slide upward and downward along the sliding groove 2223. The user can choose a suitable position to fasten the bolts 26. In addition, each of the bolts 26 is formed with a "—"-shaped groove on a portion facing toward the exterior of the protective frame, such that the user can easily fasten or release the bolt with a coin to facilitate convenient operation. Similarly, in a fourth preferred embodiment of the invention, the respective sliding grooves 2123 may be located at the respective ends of the lateral edge sections 212 in the main frame body 21, as shown in FIG. 11, so that the main frame body 21 is combined with the slide element by way of bolts 26. Therefore, the protective frame according to the invention can be adapted to various mobile phones of different lengths and allow the user to decide whether the auxiliary battery is required to be additionally installed thereby achieving a design of maximal application flexibility.

Considering presence of numerous high-priced new mobile phones and pad computers on market, as the mobile communication device becomes more and more functional, power consumption thereof keeps increasing; but due to limited progresses in battery technologies, standby time is also accordingly shortened. Hence, the protective frame and auxiliary battery according to the present invention can operate together as well as independently in order to provide excellent adaptability in use. As such, the defective prior art design can be well improved thereby offering options in auxiliary battery application. The protection feature can be maintained and multiple sets of auxiliary power sources can be prepared in advance as well by the mobile communication device user of heavy usage, thereby increasing convenience and promoting advancement of relevant technologies in conformance with market trend of mobile communication devices.

It should be noticed that, however, the illustrations set forth as above simply describe the preferred embodiments of the present invention which are not to be construed as restrictions for the scope of the present invention; contrarily, all effectively equivalent changes and modifications conveniently made in accordance with the claims and specifications disclosed in the present invention are deemed to be encompassed by the scope of the present invention delineated in the following claims.

What is claimed is:

1. A protective frame for a mobile communication device provided with a power charging port, comprising:
   a retractable frame body, including
      a main frame body;
      a sliding element, adapted for reciprocatingly sliding along a retraction direction with respect to the main frame body between a retracted protection position where the mobile communication device is fixedly framed by the retractable frame body and a stretched auxiliary power supply position; and a fastening element for fixing the sliding element with respect to the main frame body at the retracted protection position and the stretched auxiliary power supply position; and an auxiliary battery adapted for being detachably installed in the retractable frame body and electrically connected to the power charging port of the mobile communication device, when the sliding element are fixed with respect to the main frame body at the stretched auxiliary power supply position;

wherein the main frame body includes a top edge section and two lateral edge sections extending from the top edge section and arranged in substantially parallel to each other, in which each of the lateral edge sections is formed at its end remote from the top edge section with a through hole and a fixing trough having an opening, and wherein the sliding element comprises a closure section having two end edges and two sliding arms extending from the two end edges towards the two fixing troughs, and wherein the top edge section of the main frame body or the closure section of the sliding element is formed with a perforated insertion hole, and wherein the auxiliary battery further comprises an insertion connection port arranged opposite in position to the power charging port and corresponding to the perforated insertion hole.

2. The protective frame according to claim 1, wherein the mobile communication device includes a display side and a back side opposite to the display side, and wherein the auxiliary battery further includes a connector part clipped within the retractable frame body and a power storing part extending from the connector part and at least partially shielding the back side of the mobile communication device.

3. The protective frame according to claim 1, wherein the respective sliding arms are formed with two fixing holes corresponding to the through holes, so as to permit the sliding element to be positioned at either the retracted protection position or the stretched auxiliary power supply position with respect to the main frame body.

4. The protective frame according to claim 1, wherein at least one of the main frame body and the sliding element is formed with a sliding groove extending along the retraction direction, and the fastening element comprises at least one bolt extending through the sliding groove and adapted for releasably securing the sliding element to the main frame body.

5. The protective frame according to claim 1, wherein at least one of the main frame body and the sliding elements is formed with a buckling trough for buckling the connector part of the auxiliary battery to the mobile communication device when the sliding element is positioned at the stretched auxiliary power supply position with respect to the main frame body.

* * * * *

UNITED STATES PATENT AND TRADEMARK OFFICE
CERTIFICATE OF CORRECTION

PATENT NO. : 8,634,887 B2  
APPLICATION NO. : 13/398556  
DATED : January 21, 2014  
INVENTOR(S) : Li-Ming Hu et al.

Page 1 of 1

It is certified that error appears in the above-identified patent and that said Letters Patent is hereby corrected as shown below:

Title page, item [73] assignee should read as follows: Taer Innovation CO., LTD.

Signed and Sealed this  
Fourth Day of March, 2014

Michelle K. Lee  
*Deputy Director of the United States Patent and Trademark Office*